Dec. 26, 1950     V. H. PANDORF     2,535,155
NASAL FILTER
Filed Nov. 28, 1947
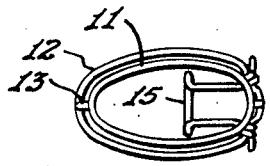
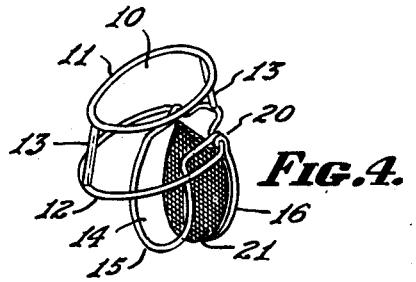
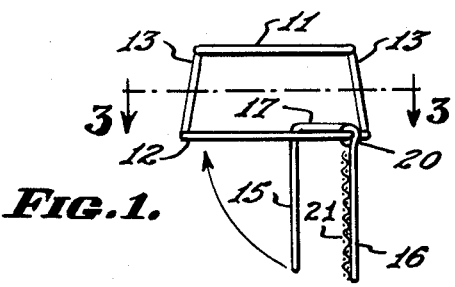
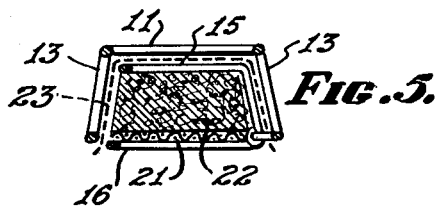
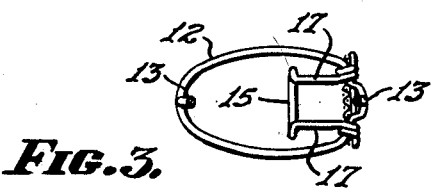
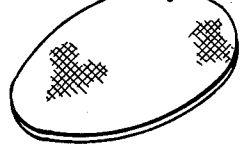
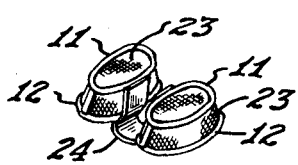
INVENTOR.
VICTOR H. PANDORF.
BY
Allen & Allen
ATTORNEYS.

Patented Dec. 26, 1950

2,535,155

UNITED STATES PATENT OFFICE 2,535,155

NASAL FILTER

Victor H. Pandorf, Cincinnati, Ohio

Application November 28, 1947, Serial No. 788,761

6 Claims. (Cl. 128—148)

This invention relates to a nasal filter or the like arranged to be worn by a human being either for the purpose of filtering out dust or pollens or the like, or for the application of medicament which is to be drawn through the nasal passages for treatment thereof or for the treatment of the bronchial tubes or the lungs.

In order for such a nasal filter to be convenient for use, it should be capable of having the filtering elements easily replaced or treated with suitable medicament. It is therefore an object of my invention to provide a device of the class set forth in which the filtering element can be very simply inserted and removed or treated with medicament if required.

A nasal filter must be arranged so that it causes a minimum discomfort to the wearer, and it should not be unsightly in appearance. It is therefore another object of my invention to provide a device of the class set forth which is shaped to fit in the nostrils of the user where it is substantially concealed from view, and which is held together by a clip member engaging the septum.

These and other objects of my invention, which I shall point out in more detail hereinafter or which will become apparent to one skilled in the art upon reading these specifications, I accomplish by that certain construction and arrangement of parts of which I shall now describe an exemplary embodiment.

Reference is made to the drawings forming a part hereof and in which:

Figure 1 is a side elevational view of a nasal filter according to my invention in open position.

Figure 2 is a plan view of the same.

Figure 3 is a cross-sectional view of the same taken on the line 3—3 of Figure 1.

Figure 4 is a perspective view of the same.

Figure 5 is a vertical cross-sectional view through the same showing the device in closed position with the filtering element inserted.

Figure 6 is a perspective view of a filtering element.

Figure 7 is a perspective view of a gauze covering element.

Figure 8 is a perspective view of the frame member alone.

Figure 9 is a perspective view of the filter holding element alone.

Figure 10 is a perspective view of the septum engaging clip and

Figure 11 is a perspective view of a pair of nasal filters assembled to a septum engaging clip.

Briefly in the practice of my invention, I provide a frame member, as shown generally at 10 in Figure 8 which is composed of a pair of substantially oval rings 11 and 12 which are held in spaced, parallel position by the spacing members 13. It will be observed that the oval ring 11 is somewhat smaller than the oval ring 12 so that the frame member 10 as a whole is of a tapered configuration so that it may fit within a nostril of the user. A filter holding member is shown generally at 14 in Figure 9 and this likewise comprises a pair of substantially oval rings 15 and 16 which are held in spaced, substantially parallel condition by the spacing elements 17. It will be observed that the rings 15 and 16 of the member 14 are smaller by a small amount than the respective rings 11 and 12 so that the filter holding element 14 may fit within the frame member 10.

In order that the filter holding member may be conveniently loaded and unloaded, I provide preferably for a hinged connection between the members 10 and 14. This hinged connection may take any one of a number of forms, and I have illustrated in the drawings one particular construction which may serve.

According to this construction the ring 12 is deformed, as at 18, to provide the pintles 19. The member 14 may be constructed from a single piece of wire, and the connecting elements 17 may be provided with the loops 20 which may be engaged over the pintles 19 to provide the above mentioned hinged connection. It will be clear that any sort of a hinged connection may be used, and that the one described above has been described only by way of example.

It will be observed that the spacing elements 17 which hold the rings 15 and 16 in spaced, parallel relation are disposed in the region of the hinge so that the major portion of the periphery of the filter holding member 14 is open for the insertion of the filtering pad. The ring 16 is provided with a fine mesh screen member 21 to support the filter pad and to prevent it from falling out.

It will be understood that the members 10 and 14 are made from stainless steel wire or similar material which can be easily cleaned and which is preferably not subject to corrosion.

I have shown in Figure 6 at 22 a filter pad which is of a shape and size to fit snugly into the filter holding member 14, as shown in Figure 5. This filter pad is of a porous material so as not to impede the wearer's breathing, and it will eliminate from the air breathed through the nostrils any dust, pollens and other foreign bodies. Medicament may, of course, be applied to the member 22 so that medicated vapors may be drawn in at each breath.

I have indicated at 23 in Figure 7 a small sheet of gauze material which is used as best seen in Figure 5. When the filter pad 22 has been inserted into the filter holding member 14 and has been treated with suitable medicament if desired, the piece of gauze 23 is laid over the ring 15, overlapping it all around. When the filter holding member is then closed upwardly into the frame member 10, the member 23 will be folded down around all sides, as indicated in Figure 5, thus enclosing the top and all sides of the filter holding member and filter pad. The separation between the members in Figure 5 is somewhat exaggerated and it may be desirable to make the dimensions such that when the parts are assembled as in Figure 5, the piece of gauze 23 will require a slight force to close completely the filter holding member 14 in the frame member 10, serving to hold the parts in the condition of Figure 5 frictionally. If for any reason this is not desired, it will, of course, be within the province of the man skilled in the art to provide a suitable catch member to hold the parts in the condition of Figure 5.

In use a complete nasal filter will comprise two devices as described above which will preferably be secured together and held in place on the wearer by means of a clip member, indicated generally at 24 in Figure 10. This will preferably be made of a piece of spring steel or the like so as to exert a slight pressure on the septum to hold it in place. The member 24 is attached in any suitable manner as by soldering or spot welding to two filters as have been described, as best seen in the assembly view of Figure 11.

It will be clear that numerous modifications may be made in the various details described above without departing from the spirit of my invention. I therefore do not intend to limit myself to any specific details described above and have set forth what I claim to be new and what I desire to secure by Letters Patent in the claims which follow.

1. A nasal filter comprising an outer frame member of a size and shape to fit snugly within a human nostril, and an inner filter pad embracing member hingedly secured to said outer frame member, said filter holding member in one position being seated within said frame member, and in another position being accessible for insertion or removal of a filter pad or the like.

2. A nasal filter comprising an outer frame member of a size and shape to fit snugly within a human nostril, and an inner filter pad embracing member, a filter pad in said filter pad holding member, an element on the lower face of said filter pad holding member to retain said pad, and a piece of gauze covering the top and sides of said filter pad holding member, and held in position by frictional engagement with said outer frame member.

3. A nasal filter comprising a frame member composed of a pair of spaced, substantially oval rings, a number of spacing members joined to said rings and holding them in substantially parallel relation, one of said rings being slightly smaller than the other whereby said frame member is shaped to substantially fit a human nostril, a filter holding member hingedly secured to the lower of said rings and comprising a pair of substantially oval rings secured together in spaced, substantially parallel relation, said last mentioned pair of rings being slightly smaller respectively than the said first mentioned pair of rings, whereby in one position said filter holding member is substantially contained within said frame member, said last mentioned pair of rings being secured together only in the region of said hinged fastening whereby to leave said filter holding member open over a major portion of its periphery, for ready insertion of a filter pad or the like.

4. A nasal filter comprising a frame member composed of a pair of spaced, substantially oval rings, a number of spacing members joined to said rings and holding them in substantially parallel relation, one of said rings being slightly smaller than the other whereby said frame member is shaped to substantially fit a human nostril, a filter holding member comprising a pair of substantially oval rings secured together in spaced, substantially parallel relation, said last mentioned pair of rings being slightly smaller respectivey than said first mentioned pair of rings, whereby said filter holding member may be substantially contained within said frame member, a filter pad in said filter holding member, a fine mesh screen on the lower face of said filter holding member to retain said pad, and a piece of gauze covering the top and sides of said filter holding member, and held in position by frictional engagement with said outer frame member.

5. A nasal filter comprising an outer frame member of a size and shape to fit snugly within a human nostril, and an inner filter pad embracing member movable in relation to said outer frame member from a position substantially contained within said outer frame member, to a position of access for the insertion or removal of a filter pad or the like.

6. A nasal filter comprising a frame member composed of a pair of spaced substantially oval rings, a number of spacing members joined to said rings and holding them in substantially parallel relation, one of said rings being slightly smaller than the other whereby said frame member is shaped to substantially fit a human nostril, a filter holding member hingedly secured to the lower of said rings and comprising a pair of substantially oval rings secured together in spaced, substantially parallel relation with a major portion of their peripheries free from securing means whereby said filter holding member is susceptible to ready insertion or removal of a filter pad, or the like, said last mentioned pair of rings being slightly smaller respectively than the said first mentioned pair of rings, whereby in one position said filter holding member is substantially contained within said frame member.

VICTOR H. PANDORF.

REFERENCES CITED

The following references are of record in the file of this patent:

UNITED STATES PATENTS

| Number | Name | Date |
|---|---|---|
| 1,950,926 | Lobl | Mar. 13, 1934 |
| 2,046,664 | Weaver | July 7, 1936 |

FOREIGN PATENTS

| Number | Country | Date |
|---|---|---|
| 407,679 | France | Mar. 8, 1910 |